United States Patent [19]

Tsujioka et al.

[11] Patent Number: 4,901,163
[45] Date of Patent: Feb. 13, 1990

[54] IMAGE READER FOR A PORTABLE COPIER

[75] Inventors: Hiroshi Tsujioka, Nara; Shigeo Yoneda, Yamatokooriyama; Yasufumi Yatsuzuka, Nara, all of Japan

[73] Assignee: Sharp Kabushiki Kaisha, Osaka, Japan

[21] Appl. No.: 108,993

[22] Filed: Oct. 16, 1987

[30] Foreign Application Priority Data

| Oct. 16, 1986 | [JP] | Japan | 61-246700 |
| Oct. 17, 1986 | [JP] | Japan | 61-248140 |
| Oct. 20, 1986 | [JP] | Japan | 61-249840 |
| Oct. 20, 1986 | [JP] | Japan | 61-249829 |
| Oct. 20, 1986 | [JP] | Japan | 61-250407 |
| Oct. 20, 1986 | [JP] | Japan | 61-250408 |

[51] Int. Cl.$^4$ .............................................. H04N 1/04
[52] U.S. Cl. ................................. 358/473; 358/471; 358/474; 358/472; 382/59
[58] Field of Search ............ 358/285, 294, 284, 264, 358/282, 45, 54, 429, 459, 463, 464, 471, 474, 472, 447, 409, 473; 382/59

[56] References Cited

U.S. PATENT DOCUMENTS

| 4,408,232 | 10/1983 | Itoh .................................... 358/264 |
| 4,581,761 | 4/1986 | Ichinokawa et al. ................ 382/59 |
| 4,639,790 | 1/1987 | Kusaka .............................. 358/285 |
| 4,701,804 | 10/1987 | Toyoda et al. ..................... 358/285 |
| 4,709,395 | 11/1987 | Fischer et al. ..................... 382/54 |
| 4,717,965 | 1/1988 | Mashiko et al. ................... 358/285 |
| 4,748,677 | 5/1988 | Yokomizo ......................... 358/282 |
| 4,751,743 | 6/1988 | Ishino ................................ 358/474 |
| 4,797,940 | 1/1989 | Sato et al. .......................... 358/473 |

FOREIGN PATENT DOCUMENTS

| 0016299 | 1/1986 | European Pat. Off. |
| 0180181 | 5/1986 | European Pat. Off. |
| 0168256 | 10/1989 | European Pat. Off. |
| 3601323 | 7/1986 | Fed. Rep. of Germany. |
| 2250245 | 5/1975 | France. |

Primary Examiner—James J. Groody
Assistant Examiner—Kim Yen Vu
Attorney, Agent, or Firm—Birch, Stewart, Kolasch & Birch

[57] ABSTRACT

An image reader of manual scan type for a portable copier is disclosed. The image reader comprises a reading head for scanning a document manually, memory means for storing image data read by the reading head, write control means for writing said image data into the memory means and a printer. The image reader further comprises image data processing means for adjusting image data obtained by the image sensor so as to form a noise free image upon writing image data into the memory means. Also the image data processing means operates to delete image data of a reference line indicative of a manual scan starting position.

7 Claims, 15 Drawing Sheets

Fig. 14
Fig. 12
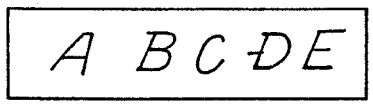
Fig. 13
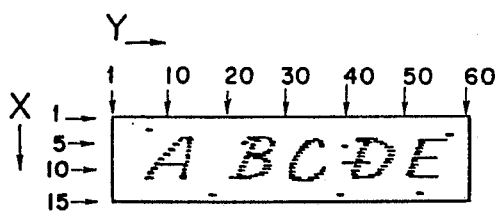
| X | (X) |
|---|-----|
| 1 | 0 |
| 2 | 0 |
| 3 | 1 |
| 4 | 7 |
| 5 | 17 |
| 6 | 10 |
| 7 | 9 |
| 8 | 17 |
| 7 | 14 |
| 10 | 10 |
| 11 | 18 |
| 12 | 5 |
| 13 | 0 |
| 14 | 2 |
| 15 | 1 |

Fig. 15(a)
Fig. 15(b)
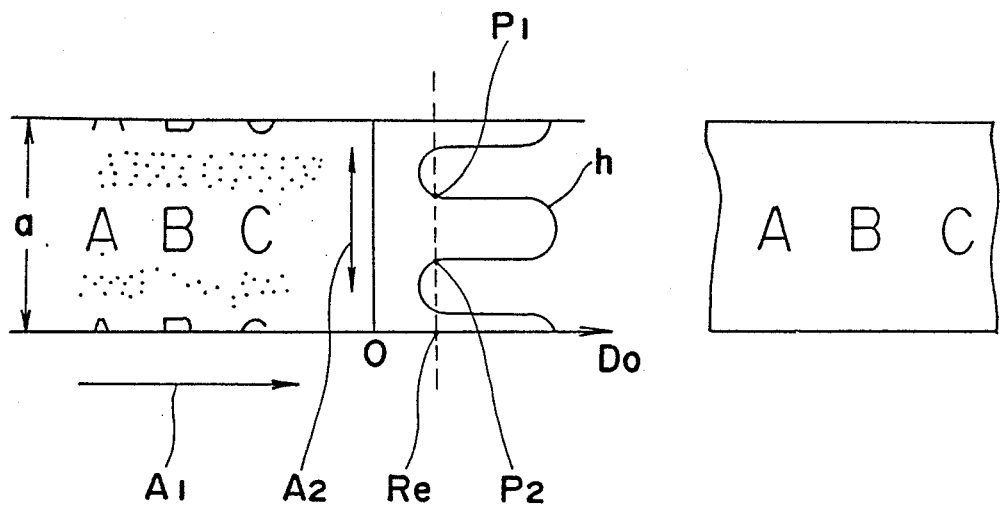
Fig. 16
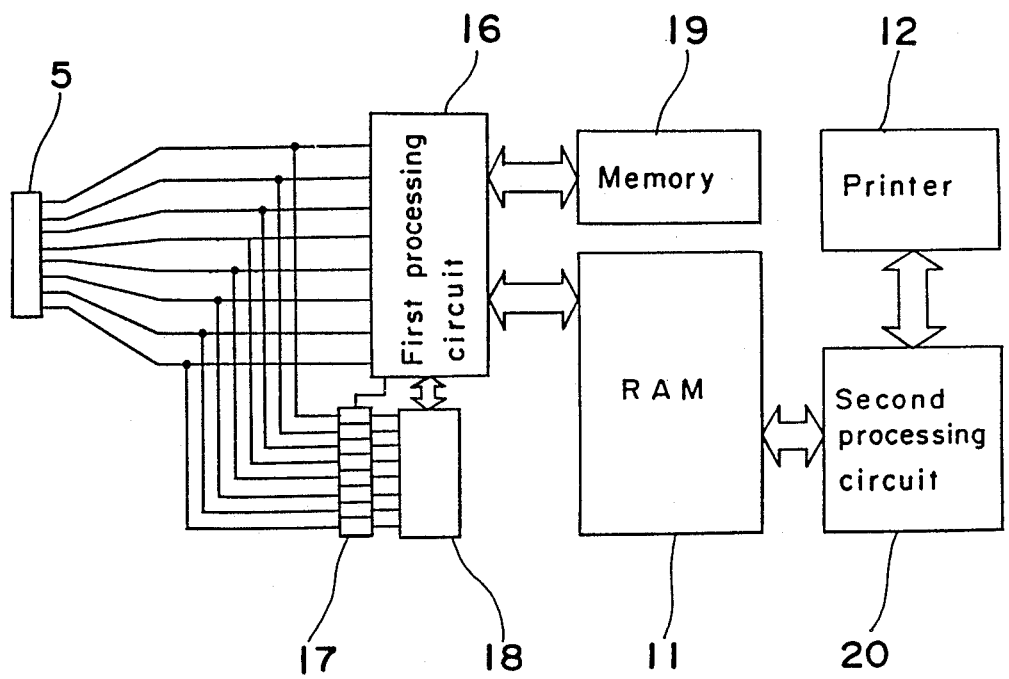

Fig. 20-(I)
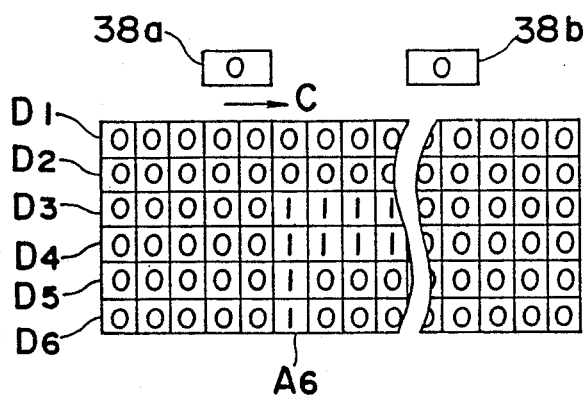
Fig. 19
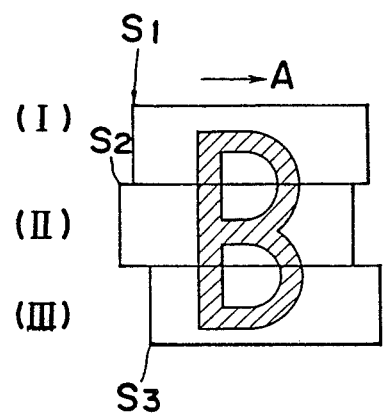
Fig. 20-(II)
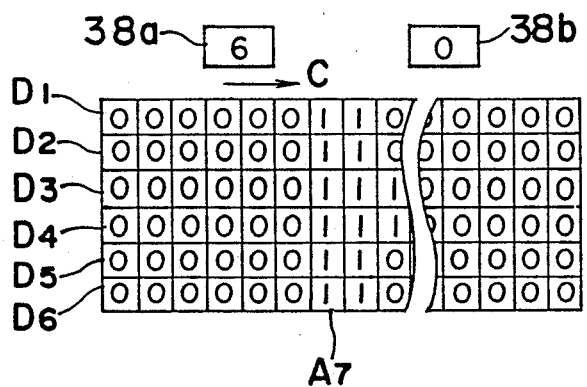
Fig. 21
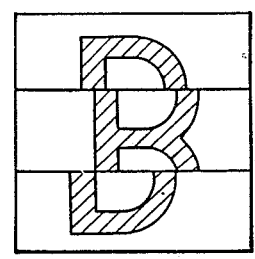
Fig. 20-(III)
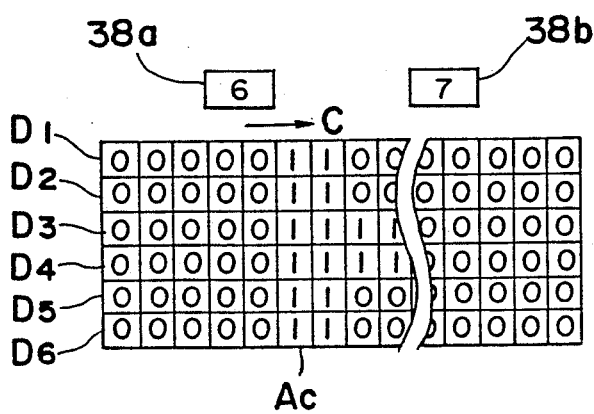

IMAGE READER FOR A PORTABLE COPIER

BACKGROUND OF THE INVENTION

1. Field of the Invention

The present invention is related to an image reader having a reading head being capable of scanning a document.

2. Description of the Prior Art

An image reader of portable type has been known. In such a portable image reader, the reading head has a relatively narrow reading width and, therefore, it is usually needed to repeat scans several times in order to read a document fully.

As is easily understood, it is very difficult to start individual manual scans from the same start line exactly. If individual starting positions of scans are shifted with each other, image data obtained by individual scans are also shifted. This causes a defective image upon printing.

In order to solve the problem mentioned above, means for setting a reference line relative to a document to be read is proposed. However, the reference line is also printed out when said means is used.

Further, there is a possibility that the same portion of a document is read repeatedly. If the same portion is printed out repeatedly, the print density thereof will become different from that in the other portion even if possible shifts between two image data obtained by sucessive scans have been eliminated.

SUMMARY OF THE INVENTION

One object of the present invention is to provide an image reader being capable of adjusting image data so as to form only noise free image data.

Another object of the present invention is to provide a method being capable of composite image data without any shift between image data obtained by two successive scans.

One more object of the present invention is to provide an image reader which memorizes image data only if the reading head has been moved for scanning a document.

In order to achieve these objects, according to the present invention, there is provided an image reader comprising a reading head being capable of scanning a document which is comprised of detection means for generating pulses according to the movement of the reading head and an image sensor for reading the document image in a manner synchronized with pulses generated by the detection means, memory means for storing image data obtained by the image sensor, write control means for writing said image data into the memory means, image data processing means for adjusting image data obtained by the image sensor so as to form an image having noise removed therefrom when writing image data into the memory means, and a printer for printing out an image according to image data adjusted.

BRIEF DESCRIPTION OF DRAWINGS

These and other objects and features of the present invention will become more apparent when the preferred embodiment of the present invention is described in detail with reference of accompanied drawings in that;

FIG. 10 is a flowchart of the subroutine SUB 3 shown in FIG. 9;

FIG. 12 is an example of an image to be read;

FIG. 13 shows dot image data obtained by reading the image shown in FIG. 12;

FIG. 14 shows respective sums of black dots counted along individual rows shown in FIG. 13;

FIG. 15($a$) shows an example of an image to be read;

FIG. 15($b$) shows an example of printing out when image data are adjusted according to one of the preferred embodiments of the present invention;

FIG. 16 is a block diagram of an image reader according to the preferred embodiment of the present invention;

FIG. 19 is an explanatory view for showing manual scans made for reading an image;

FIGS. 20-(I), 20-(II) and 20-(III) show a method for composing image data obtained by manual scans shown in FIG. 19;

FIG. 21 is an explanatory view of a printed image obtained when the adjustment of image data was not done;

FIG. 24 shows digital data obtained by scans shown in FIG. 23;

FIG. 25 shows digital data obtained when dot data of the reference line are deleted according to one of the preferred embodiment;

DESCRIPTION OF THE PREFERRED EMBODIMENT

First Preferred Embodiment

Figure 1:
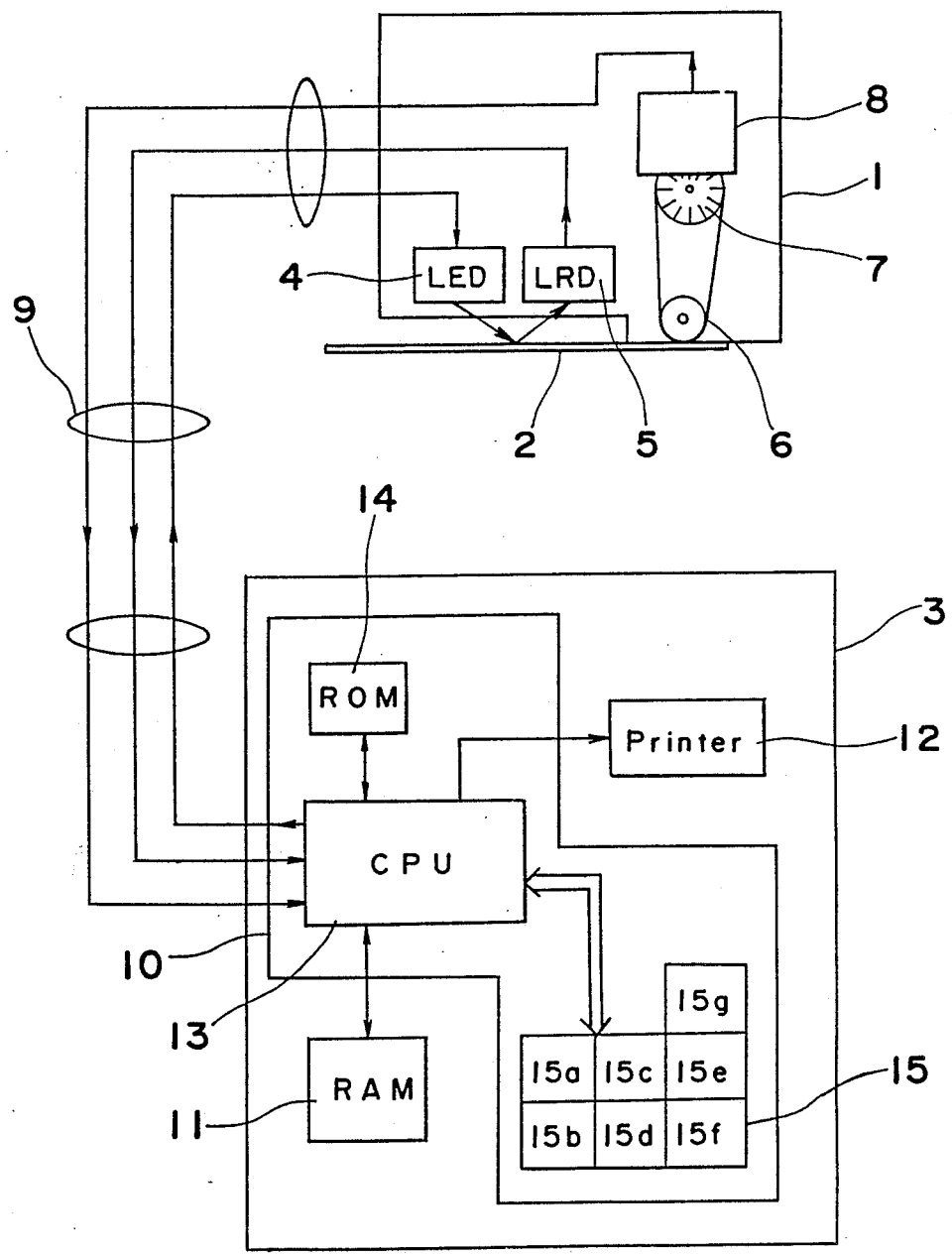
FIG. 1 is a block diagram of an image reader according to the present invention.

FIG. 1 shows a block diagram of the image reader according to the present invention.

As shown in FIG. 1 schematically, the image reader is comprised of an image reading apparatus 1 for reading an image of a document 2 including character image, figure image and/or picture image and a main body 3 for processing image data transmitted from the image reading apparatus 1. Usually, the image reading apparatus 1 and the main body 3 are formed separately. The image reading device 1 provides a light emitting device (LED) 4 for projecting light rays onto the document 2 and a light receiving device (LED) 5 for receiving light rays reflected from the document. It provides further a rotatable means 6 which is rotated in contact with the document 2 according to the movement thereof, a circular disk 7 having slit-like apertures for detecting the rotation of said rotatable means 6 and a photo-interruptor 8 for generating electric pulses corresponding to respective apertures.

The image reading apparatus 1 is electrically connected to the main body with connecting lines 9.

The main body 3 contains a controller 10, a random access memory (RAM) 11 and a printer 12. The controller 10 provides a central processing unit (CPU) 13, a read-only memory (ROM) 14 and a switch group 15. Individual switches from 15a to 15g which constitute the switch group 15 are assigned to respective functions as follow:

15a: Power switch for switch ON or OFF an electric power source to the image reader, 15b: Switch for selecting an enlargement mode for enlarging an original image twice, 15c: Switch for switching from a graphic mode to a word mode or vice versa, 15d: Repeat switch for printing the latest image having been outputted already, 15e: Clear switch for erasing image data having been memorized in the RAM 11, 15f: Image entry switch for entering image data while it is kept depressed and the rotatable means 6 (the circular plate 7) is rotated, and 15g: Lay-out switch for selecting a lay-out mode.

All of switches of the switch group 15 are not necessarily arranged on the main body 3 and, therefore, some switches can be arranged on the image reading apparatus 1. Further, the image reading apparatus 1 can be assembled with the main body 3 so as to form an integral unit.

Operation of the image reader is as follows.

In the usual operation mode thereof, the power switch 15a is turned ON but the enlargement switch 15b, graphic switch 15c and lay-out switch 15g are kept OFF.

Figure 2:
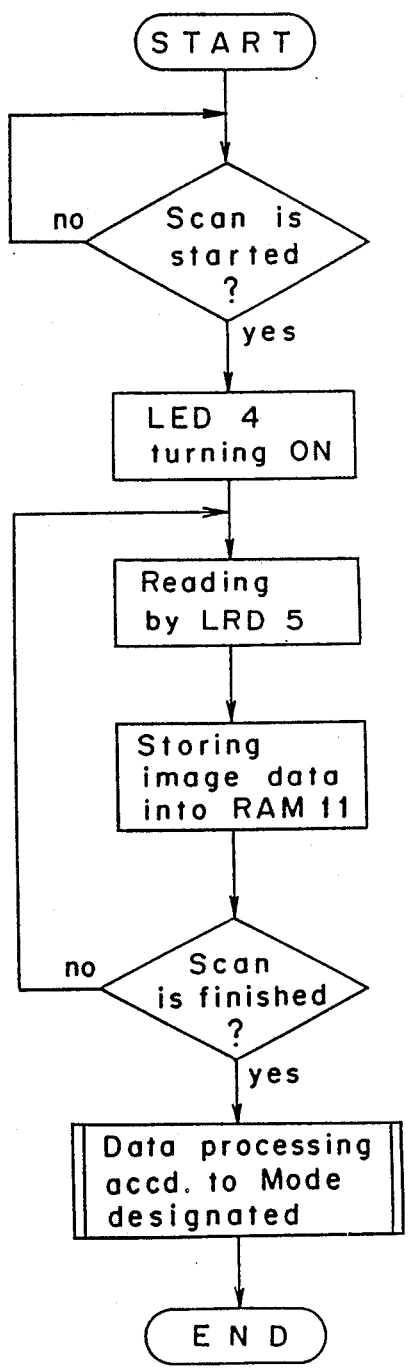
FIG. 2 is a flowchart of a main routine to be executed by CPU provided for controlling the image reader.

As shown in FIG. 2, when the image entry switch 15f is operated, the image reading apparatus 1 is started to scan the document. The circular disk 7 is rotated during the scan and, according thereto, ON and OFF signals are generated by the photo-interruptor 8. These ON and OFF signals are detected by the CPU 13. At that time, the light emitting device 4 is turned ON and the bright and the dark contained in the reflected light from the document are detected by the light receiving device 5 to obtain image data. The image data thus obtained are entered into the RAM 11 through the CPU 13. The entry of image data is finished when the image entry switch 15f is turned OFF or when the RAM 11 is fully occupied with image data.

When the entry of image data is completed, the CPU 13 processes image data having been entered and memorized in the RAM 11 according to the processing mode designated by setting the switch group 15. After processing image data, they are outputted to the printer 12 to print an image onto a blank of print paper.

Various data processing to be performed by the controller 10 will be explained in the following order.

Figure 3:
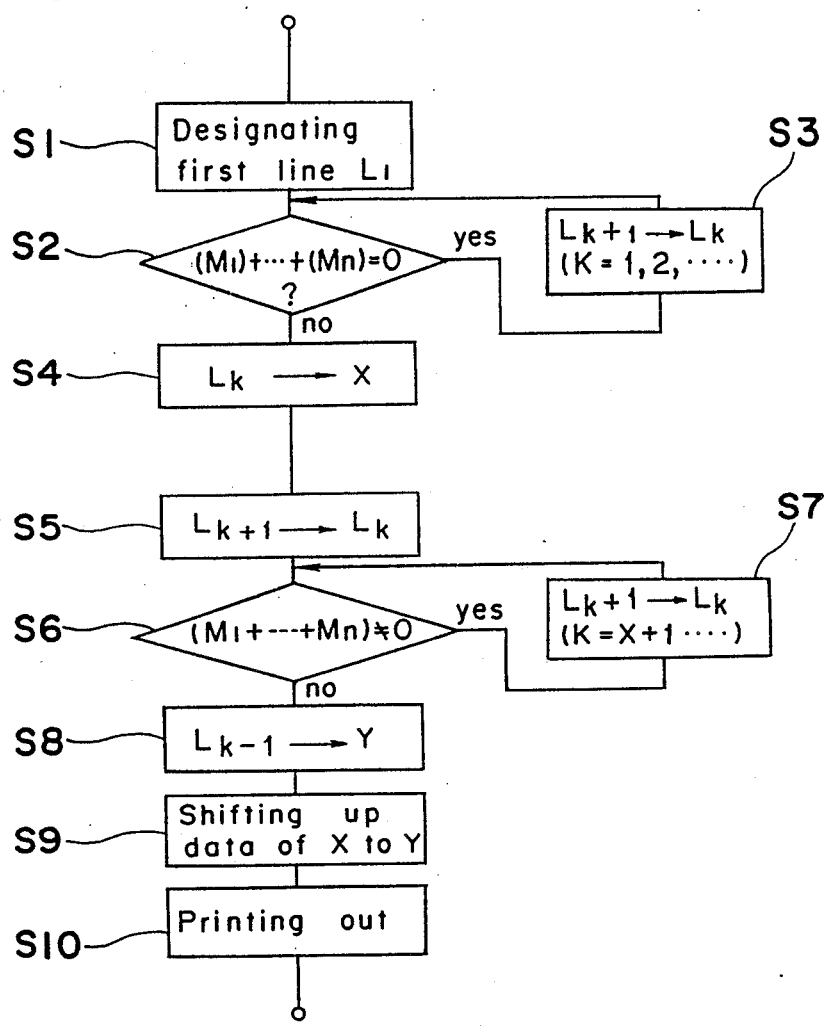
FIG. 3 is a flowchart of a sub-routine to be executed upon restricting the width of a printing line by the printer.

(a) Control of printing-width
(b) Enlargement processing
(c) Removal of noise data
(d) Deletion of reference line data (a) Control of printing-width FIG. 3 shows a flow chart for controlling the width of printing line of the printer.

Figure 4:
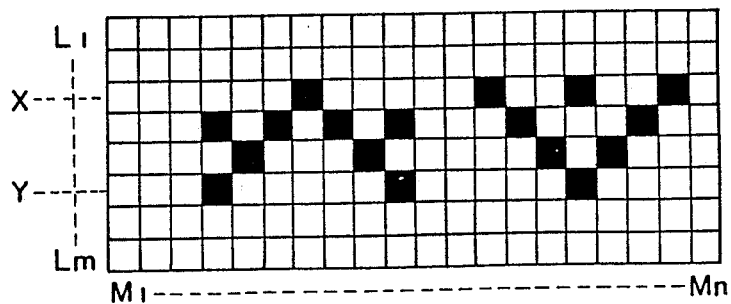
FIG. 4 is an example of dot image data in order to show parameters used in FIG. 3.
Figure 5:
FIG. 5 shows the reading width by the reading head.

Before starting the explanation of the flow chart, let us assume that image data having been stored in the RAM 11 are those shown in FIG. 4. The image data of FIG. 4 has an area defined by m lines×n rows and individual dot data are denoted by line number×row number such as $L_i \times M_j$. Dot data to be printed are represented as black dots in FIG. 4.

Returning now to FIG. 3, at step S1, the first line $L_1$ is designated. Then, the total number of black dots on the first line $L_1$ is counted up at step S2. If the total number thereof is zero ($M_1 + \ldots + (M_n) = 0$, namely there is not any black dot on the line $L_1$, the next line $L_2$ is designated at step S3. This process is repeated as long as the total number of black dots on the line $L_k$ is equal to zero.

If the total number is not zero, namely, at least one black dot is contained in a line $L_k$, the line number $L_k$ is registered in X-register provided in the RAM 11 at step S4. Accordingly, in the example of FIG. 3, the line number $L_3$ is registered at first.

Then, the line number $L_k$ is incremented to $L_{k+1}$ at step S5 and it is checked at step S6 whether there is at least one black dot or not, namely, the total number of black dots is equal to zero or not. If there is at least one black dot, the line number $L_k$ is incremented by one at step S7 and the check of black dots is repeated at step S6. Namely, this check is repeated until the total number of black dots becomes equal to zero.

When the total number becomes equal to zero on the $L_k$ at step S8, the line number of the line just before the line $L_k$, namely $L_{k-1}$ is registered into Y-register provided in the RAM 11. In the example of FIG. 4, the line number $L_6$ is registered in Y-register ($Y = L_6$).

Thus, the area defined between the line X and the line Y is found to be an area containing black dots to be printed out.

At step S9, all of data contained in the area found are shifted up on the memory in such a manner that the line X is positioned on the first line while keeping relative positions among data. In the example of FIG. 4, each of lines from X to Y is shifted up two lines.

Then, the printing width of the printing head of the printer 12 is restricted so as to cover only the area having been shifted up and, then, one line corresponding to the area is printed out at step S 10. Assuming the aligned characters A through N having a character height of "b" are read by the image reader with the reading head of width "a" two times, according to the present invention, it becomes possible to print out two lines each having the width "b" in between a line space of "c".

Figure 6:
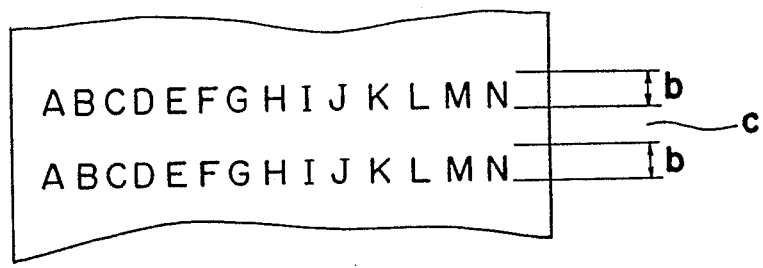
FIG. 6 is an example of printing out based on the subroutine shown in FIG. 4.
Figure 7:
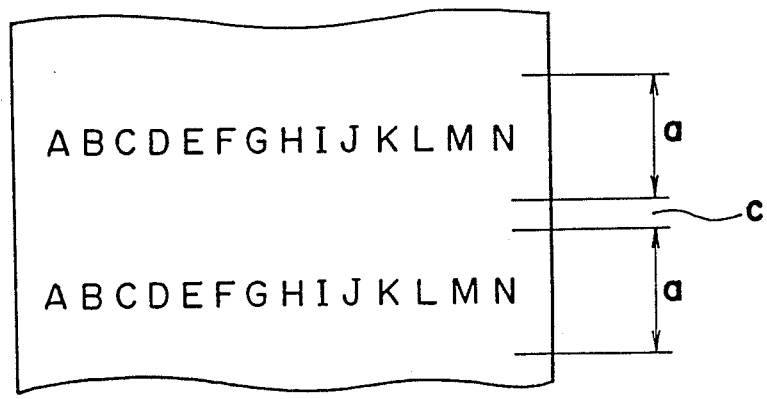
FIG. 7 is an example of a document to be read.

As is apparent from the comparison of FIG. 6 with FIG. 7, useless blank portions are eliminated in the former and, therefore, printed image looks somewhat compressed. This contributes to improve the quality of print.

(b) Enlargement processing

Figure 8:
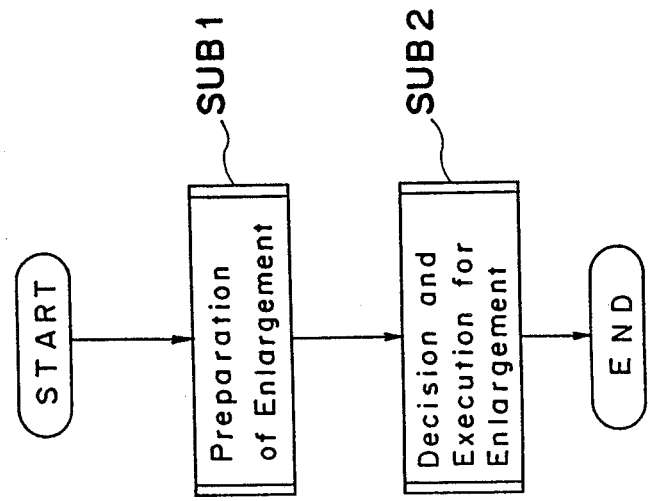
FIG. 8 is a flowchart of a main routine to be executed upon enlarging an image.
Figure 9:
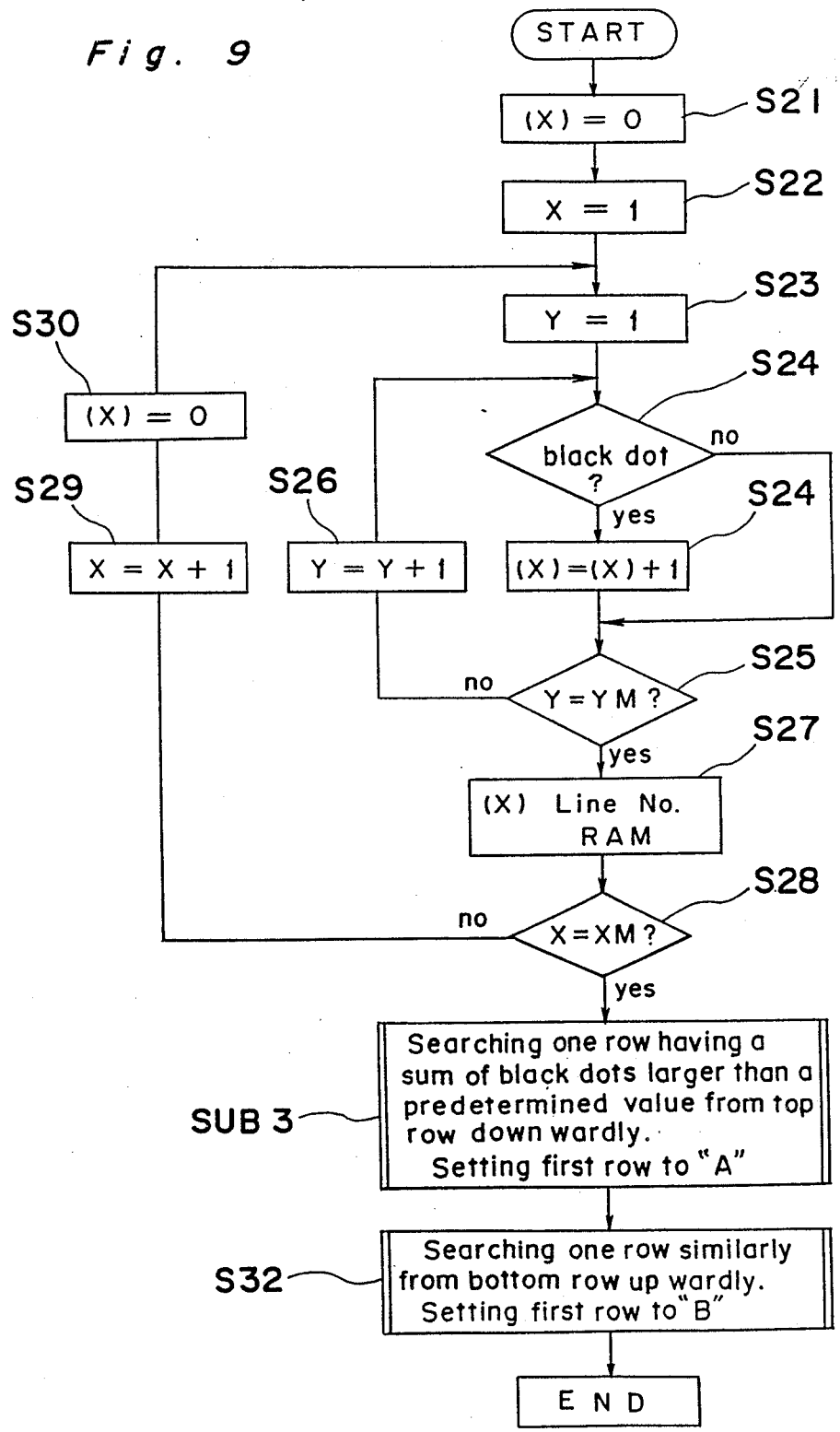
FIG. 9 is a flowchart of the subroutine SUB 1 shown in FIG. 8.
Figure 11A:
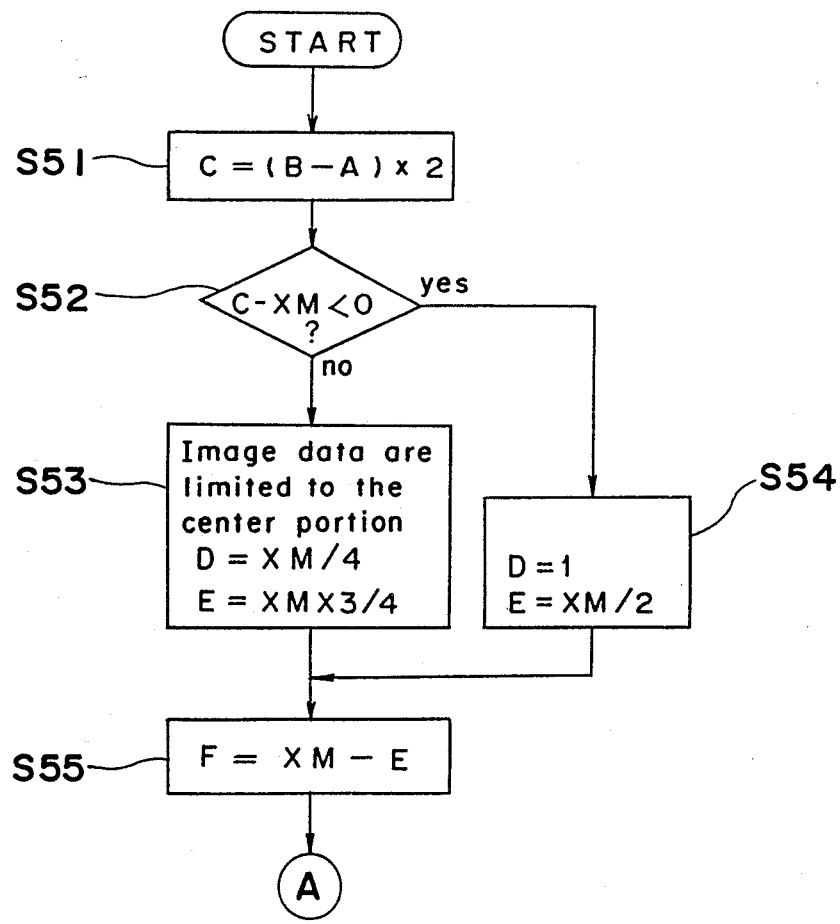
FIGS. 11($a$) and 11($b$) show a flowchart of the subroutine SUB 3 shown in FIG. 8.
Figure 11B:
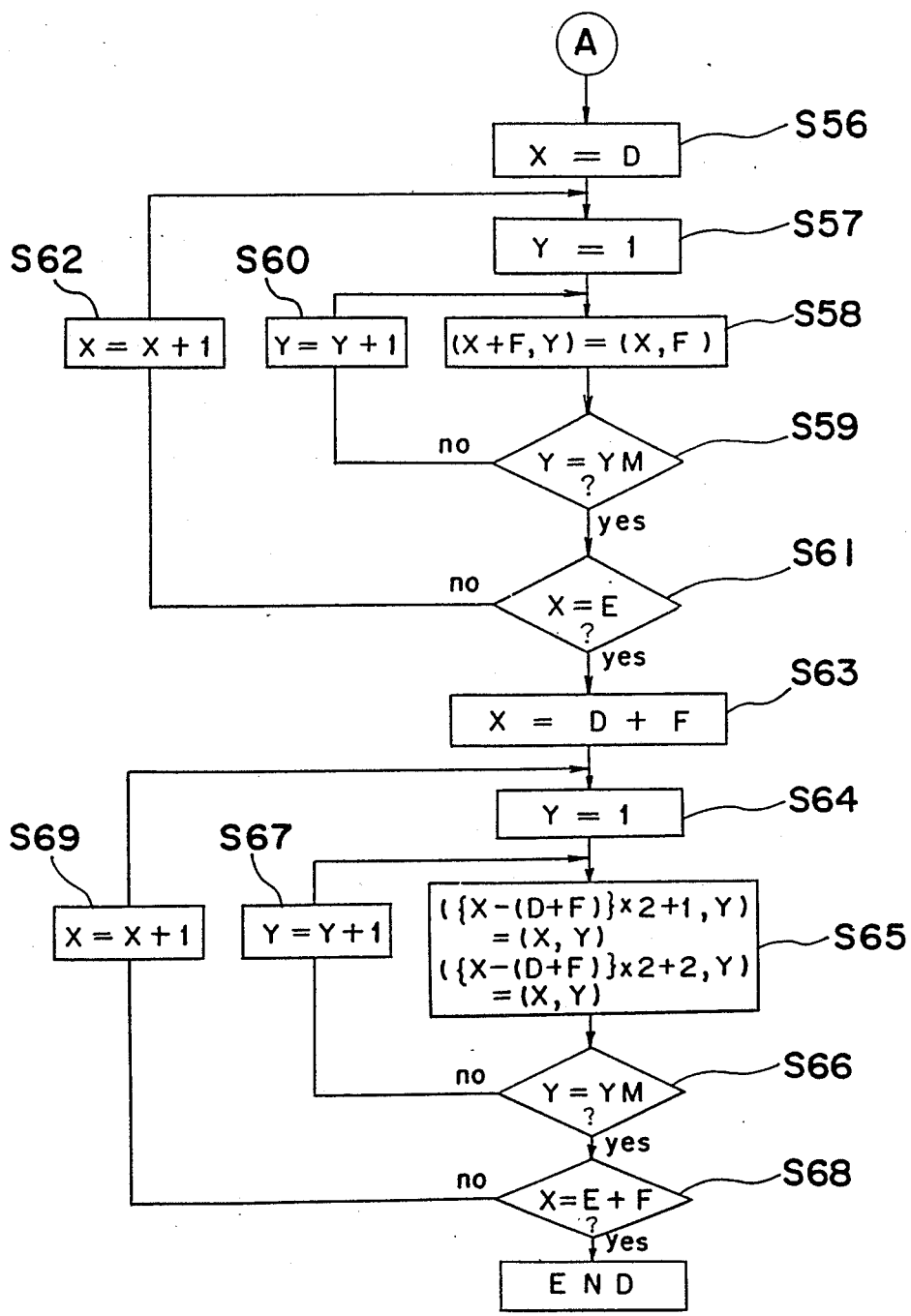

The enlargement processing is done by executing subroutines SUB1 and SUB2 as shown in FIG. 8. FIGS. 9 and 11(a) and 11(b) show individual contents of the subroutines SUB1 and SUB2, respectively and FIG. 10 shows content of a subroutine SUB3 of FIG. 9.

In order for simplicity, let us assume such hand-written characters as shown in FIG. 12. Dot image data obtained when they are read by the image reader are shown in FIG. 13. In FIG. 13, all numerals are represented in the unit of mm. According thereto, the reading height measured along the longitudinal axis X (the width of one line to be read) is 15 mms, the reading length measured along the horizontal axis Y is 60 mm and the dot density is 1 dot/mm. Hereinafter, individual dots are denoted with use of X, Y-coordinates in the unit of mm.

In FIG. 14, the total number of black dots contained in each line per 1 mm shown in the right column.

Returning now to FIG. 8, when an enlargement of twice the document image is designated, the subroutine SUB1 is executed for preparation of the enlargement processing.

As is easily understood from FIG. 9 which shows the content of the subroutine SUB1, each sum (X) of black dots per each one line is calculated and stored in the RAM 11 by executing steps from S21 to S30. Then, a subroutine SUB3 is executed. This subroutine SUB3 is shown in FIG. 10. As shown in FIG. 10, the sum (X) (X=1, 2, ...) is compared with predetermined criterion value successively from the top line (X=1) (step S42). This criterion is set so as to determine a start line A from which the dot image data begins. When the sum (X) becomes larger than the criterion value, the line number X at that time is registered in A register. If there is no line having the sum larger than the criterion value, it is decided that the area read is a blank area and, therefore, the maximum line number XM is registered into A register (step S46).

After execution of the subroutine SUB3, a bottom line B on which the dot image data ends is searched according to a method similar to that of the subroutine SUB3 at step S32.

After execution of the subroutine SUB1, the process is proceeded to the subroutine SUB2 in FIG. 8. The content of the subroutine SUB 2 is specifically shown in FIGS. 11(a) and 11(b).

If the criterion value is set to "3", line numbers A and B of the start and bottom lines are determined to "4" and "12", respectively, as is apparent from FIG. 14.

In the flowchart of FIGS. 11(a) and 11(b), the height C of dot image when enlarged twice is calculated according to the following equation at step S51.

$$C=(B-A)\times 2$$

This height is compared with the reading width XM which correspond to the printing width. If the former (C) is larger than the latter (XM) (C>XM), the upper limit line D and the lower limit line E of the image data to be enlarged are designated to XM/4 and (XM×¾) at step S53, respectively. Namely, only dot data existing an area defined between the line (XM/4) and the line (XM×¾) are used upon the enlargement.

If the height C is equal to or smaller than the reading width XM, since the enlarged image data can be stored in the RAM 11 entirely, the upper limit line D is set to "1" and the center line E is set to (XM/2) at step S54.

At step S55, shift amount F for the enlargement is calculated.

The upper half of the dot image is enlarged by executing the upper routine containing steps from S56 to S 62. Similarly, the lower half of the dot image is enlarged by executing the lower routine containing steps from S63 to S68.

Thus, according to the present invention, only image data available for printing are enlarged and stored in the RAM 11. Therefore, image data can efficiently be stored in the RAM.

(c) Removal of noise data (c-1) Principle employed therefor

Suppose now that an image as shown in FIG. 15(a) is read by the reading head having a reading width "a". In the right side portion of FIG. 15(a), there is shown a curve "h" which represents each sum of black dots per every dot line along a direction indicated by an arrow $A_1$. This curve "h" has three peak portions and two bottoms.

If we introduce one criterion, i.e., a predetermined sum valve Re for discriminating individual peak portions, three peak portions are determined in the example of FIG. 15(a). If we designate the central peak portion and only dot image data contained in an area defined between the line $P_1$ and the line $P_2$ corresponding to the central peak portion are used for printing, only the desired image is printed out as shown in FIG. 15(b). Accordingly, noise data is removed prior to printing.

(c-2) Composition therefor

FIG. 16 is a functional block diagram of the image reader.

As shown in FIG. 16, individual one-bit image signals from respective sensor elements of the reading head 5 are input into a first processing circuit 16 and an integrating circuit 17 for counting the number (or sum) of black dots per one line.

Individual sums obtained by the integrating circuit 17 are outputted into a decision circuit 18 for comparing respective sums with the predetermined criterion (Re) and for choosing necessary data to be printed according to the method mentioned in section (c-1).

All dot image data are stored into a memory 19 temporarily and only the desired data chosen by the decision circuit 18 and which is now free of noise are memorized in the RAM 11. The desired noise free data memorized are read by second processing circuit 20 which controls and drives the printer 12. The printer 12 prints out an image according to dot image data signals outputted from the second processing circuit 20.

Thus, undesired noise data are removed prior to printing. This serves to improve the printing quality.

SECOND PREFERRED EMBODIMENT

Figure 17:
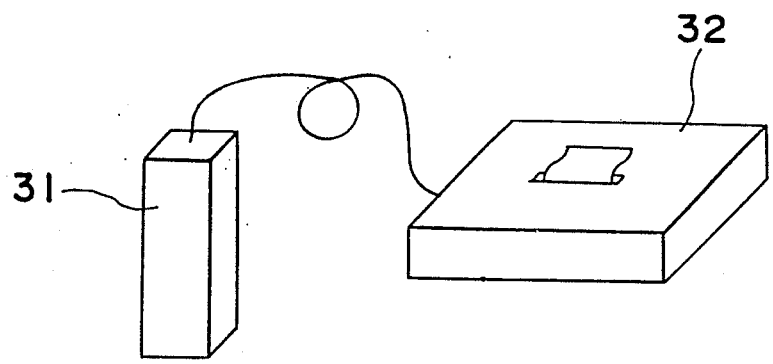
FIG. 17 is a schematic perspective view showing a portable image reader.

The second preferred embodiment is related to a portable image reader as shown in FIG. 17. The portable image reader is comprised of an image sensor 31 and a printer 32 connected with each other by a connecting code.

Figure 18:
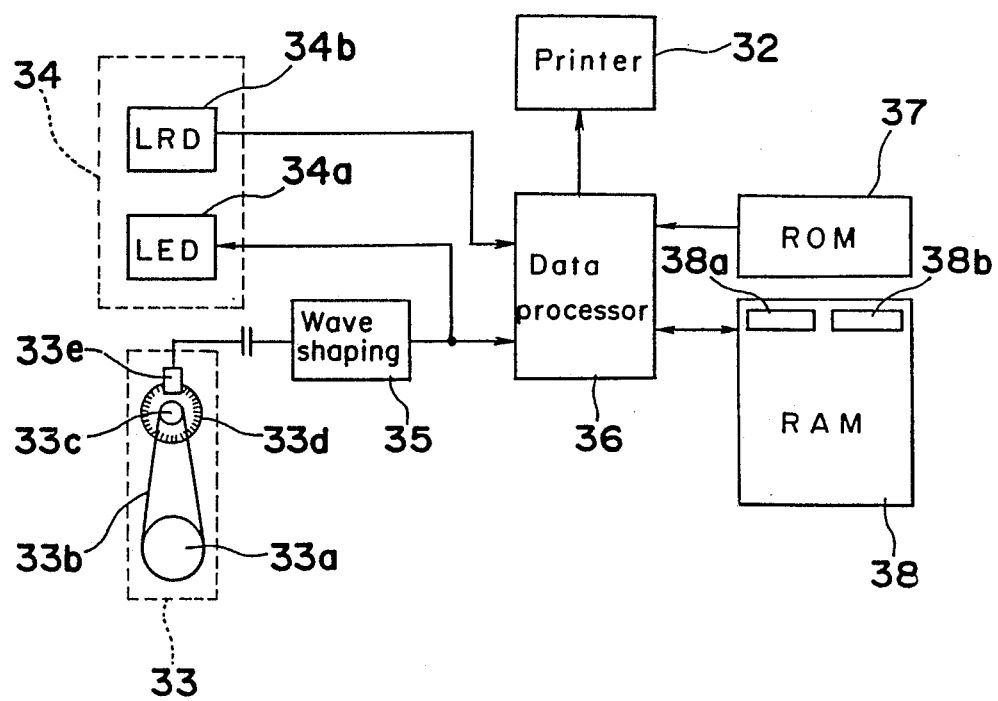
FIG. 18 is a block diagram of the portable image reader shown in FIG. 17.

FIG. 18 shows a block diagram of the image reader.

The image sensor 31 includes a detection means 33 for detecting a moved distance of the image sensor 31 and a reading head 34 for reading an image on a document optically. The detection means 33 includes a detection pulley 33a being so housed in the housing of the image sensor 31 as to contact with a document at the lower periphery thereof and to rotate according to the movement of the image sensor 31, a transmission pulley 33c being rotated via an endless belt 33b according to the rotation of the detection pulley 33a, a circular disc 33d having a plurality of slits formed at an equi-angular pitch radially which is fixed to the transmission pulley 33c co-axially and a photo-interrupter 33e for outputting detection signals corresponding to respective slits of the circular disc 33d.

The reading head 34 which constitutes the image sensor 31 together with the detection means 33 is comprised of light emitting means 34a which project light onto a document in a manner synchronized with detection signals outputted from the photo-interrupter 33e and light receiving means 34b for reading an image on the document by receiving reflected light including image data illuminated by the light emitting means 34a.

Detection signals outputted from the detection means 33 are shaped into pulses by a wave-form shaping circuit 35 and shaped signals are input to a data processor 36 as detection pulses for detecting a distance moved and are utilized to drive the light emitting means 34a in a synchronized manner therewith. The data processor 36 processes data according to programs stored in a read only memory (ROM) 37 and data processed are temporarily stored in a random access memory (RAM) 38. Further, the data processor 36 sends dot image data stored in the RAM 38 to the printer 32 together with various control signals when printing. The RAM 38 includes the first area 38a for memorizing an address of the predetermined data in the reading direction at the lower most bit of the latest data and the second area 38b for memorizing an address of the predetermined data in the reading direction at the upper most bit of data to be read at the present time.

In the image portable type reader, the image sensor 31 is manually moved when reading image data on a document. Usually, the reading head 40 has a reading width narrower than the width of a document to be read. Accordingly, it becomes necessary to move the image sensor 31 several times in order to read whole image to be read. In such a case, it becomes important how to combine respective image data having been read at respective manual scans.

Consider the case where an image "B" is read by three manual scans (I), (II) and (III) as shown in FIG. 19.

In the first manual scan, the reading head is started from position S1 in the direction indicated by an arrow A. Also, in the second and third manual scans (II) and (III), the reading head is started from positions S2 and S3, respectively.

Image data obtained by the first, second and third manual scans are shown in FIGS. 20-(I), 20-(II) and 20-(III), respectively. In these Figures, "0" denotes a white dot and "1" denotes a black dot. When image data of 6 bits from $D_1$ to $D_6$ obtained by the first scan (I) are stored in the RAM 38, each logical sum between one dot data of the upper-most bit $D_1$ and corresponding one of the next bit $D_2$ is calculated successively along the direction C in order to find out an address at which the logical sum becomes "1". As is apparent in FIG. 20-(I), there is not any black dot in both of bits $D_1$ and $D_2$. Accordingly, zero is stored in the second area 38b. Also, since this is the first manual scan, zero is stored in the second area 38a. Then, a difference between value stored in the first and second areas is calculated. Since the difference is zero in the first scan (I), the first image data obtained thereby are not shifted.

Next, each logical sum between corresponding two dot data of the bottom bit $D_6$ and the second bit $D_5$ from the bottom is calculated successively in the direction C in order to search an address wherein both dot data are equal to "1".

As is apparent from FIG. 20-(I), the address is determined to be $A_6$ and, accordingly, the address number "6" is registered newly in the first area 38a as shown in FIG. 20-(II) which shows second image data obtained by the second manual scan. Thereafter, the first image data are printed out by the printer 32 or are kept memorized in the RAM 38.

With respect to the second image data shown in FIG. 20-(II), each logical sum between corresponding two dot data of the upper-most bit $D_1$ and the second bit $D_2$ is calculated successively and the address sought is found out to be $A_7$. Accordingly, the second area 38b is renewed to be "7" as shown in FIG. 20-(III).

Next, a difference between values (6,7) of the first and second areas 38a and 38b is calculated. Since the difference is equal to 1 ($7-6=1$), the second image data are shifted by one dot in the direction opposite to the direction C as shown in FIG. 20-(III). Due to this shift, the second image data is adjusted so as to have a correct position relative to the first image data.

After the shift of the second image data, each logical sum between corresponding two dot data of the bottom bit $D_6$ and the second bit $D_5$ from the bottom of the shifted second data is calculated successively to search an address at which both dot data are equal to "1". In this case, the address is $A_6$ as is apparent from FIG. 20-(III), and, accordingly, the first area 38a remained unchanged. Thereafter, the second image data are printed out or memorized in the RAM 38 as is.

With respect to the third image data obtained by the third manual scan, data processing similar to those mentioned above is executed although it is not specifically shown.

According to the data processing mentioned above, the image is correctly reproduced even if starting position of individual manual scans are different from each other.

FIG. 21 shows an image obtained if readjustment is done.

Thus, according to the present embodiment, image data obtained by successive manual scan are automatically adjusted as if they were started from a common starting line.

(d) Deletion of reference line data

In order to solve the problem of a possible shift between two starting positions of successive manual scans, there has been known a method whereby a reference line readable by the reading head is provided for adjusting image data obtained by individual manual scans so as for respective reference lines having been read to coincide with each other.

However, in this method, the image of the reference line is printed together with a document image.

Figure 22:
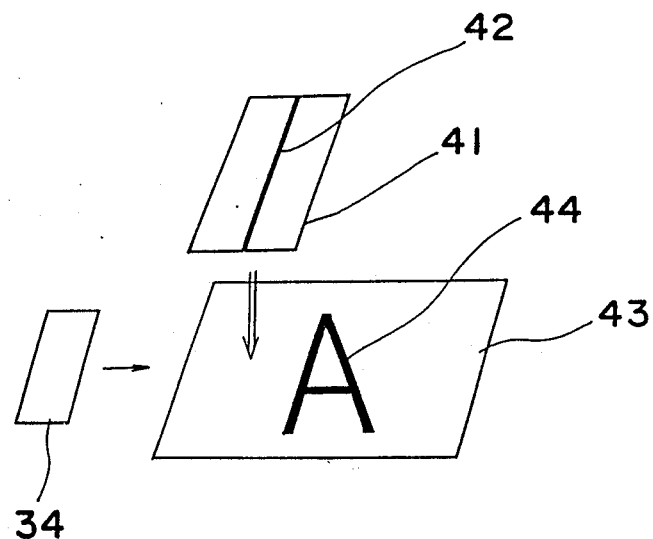
FIG. 22 is an explanatory perspective view for showing reference line means.

FIG. 22 shows a reference means 41 being comprised of an elongated transparent plate on which a reference line 42 is drawn along the center line in the length-wise direction thereof. Upon reading a document 43, the reference plate 41 is set along the top edge of the document 43. Therefore, the reading head 34 first passes the reference line 42 and, then, begins to read a document image 44.

Figure 23:
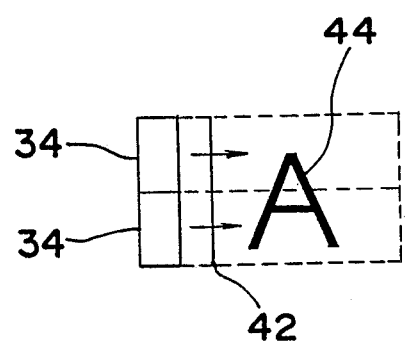
FIG. 23 is an explanatory plan view for showing manual scans with use of said reference line means.
Figure 26:
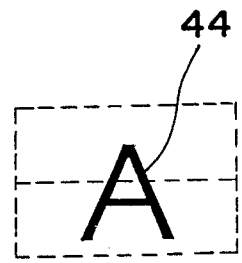
FIG. 26 shows the image printed out according to the preferred embodiment.
Figures 24, 25:
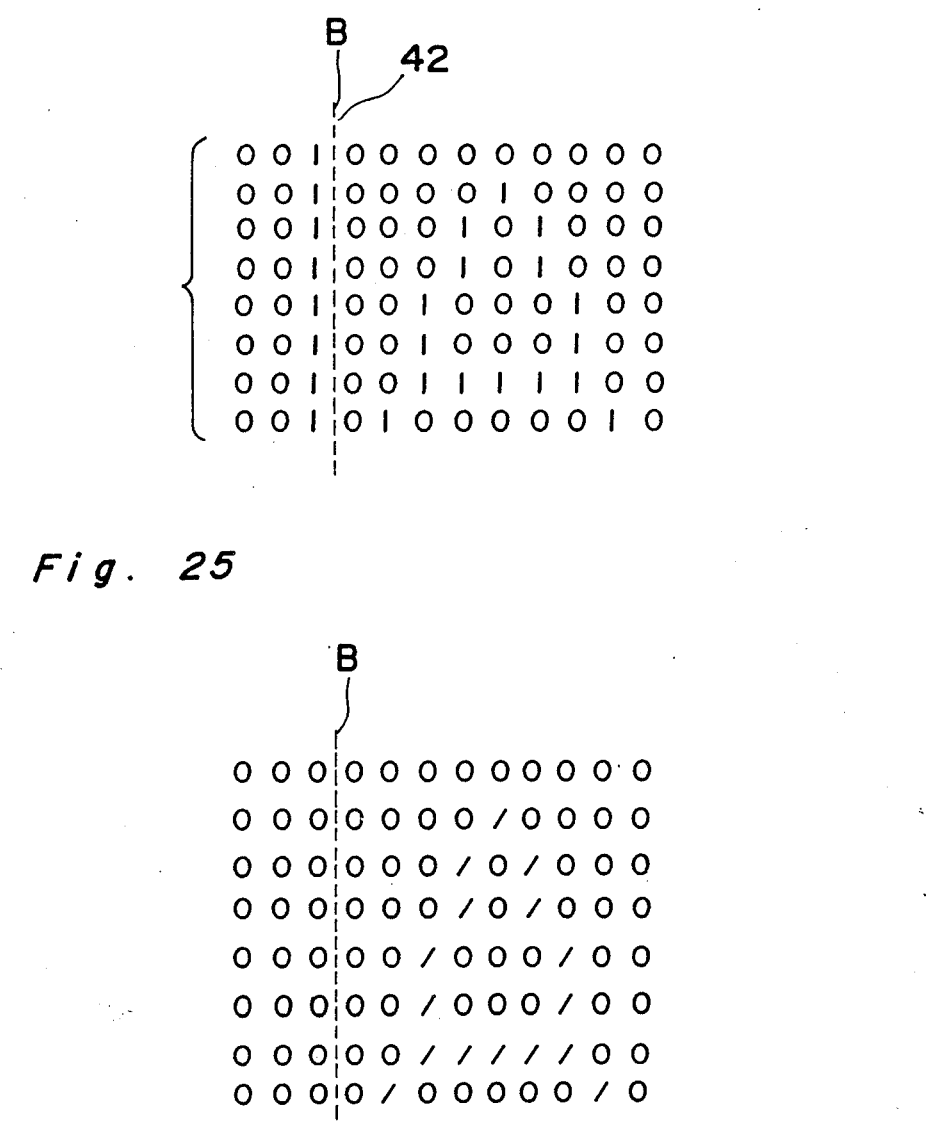

Assuming that the document image 44 is fully read by two scanning operations as shown in FIG. 23, dot image data are obtained as shown in FIG. 24. As indicated by B, the column line B on which dot data of "1" are aligned corresponding to the reference line 42.

Upon printing dot image data, dot data aligned along the column line B are all transformed from "1" to "0" as shown in FIG. 25. Accordingly, the reference line 42 is not printed and only the document image 44 is printed out.

Further, in of the manual scan type image reader, the reading head is apt to move without intention of scanning. Since the reading head has the detection means for detecting movement of the reading head, it detects even an unintentional slight movement of the reading head and generates pulses the number of which to be counted by a counter.

Figure 27:
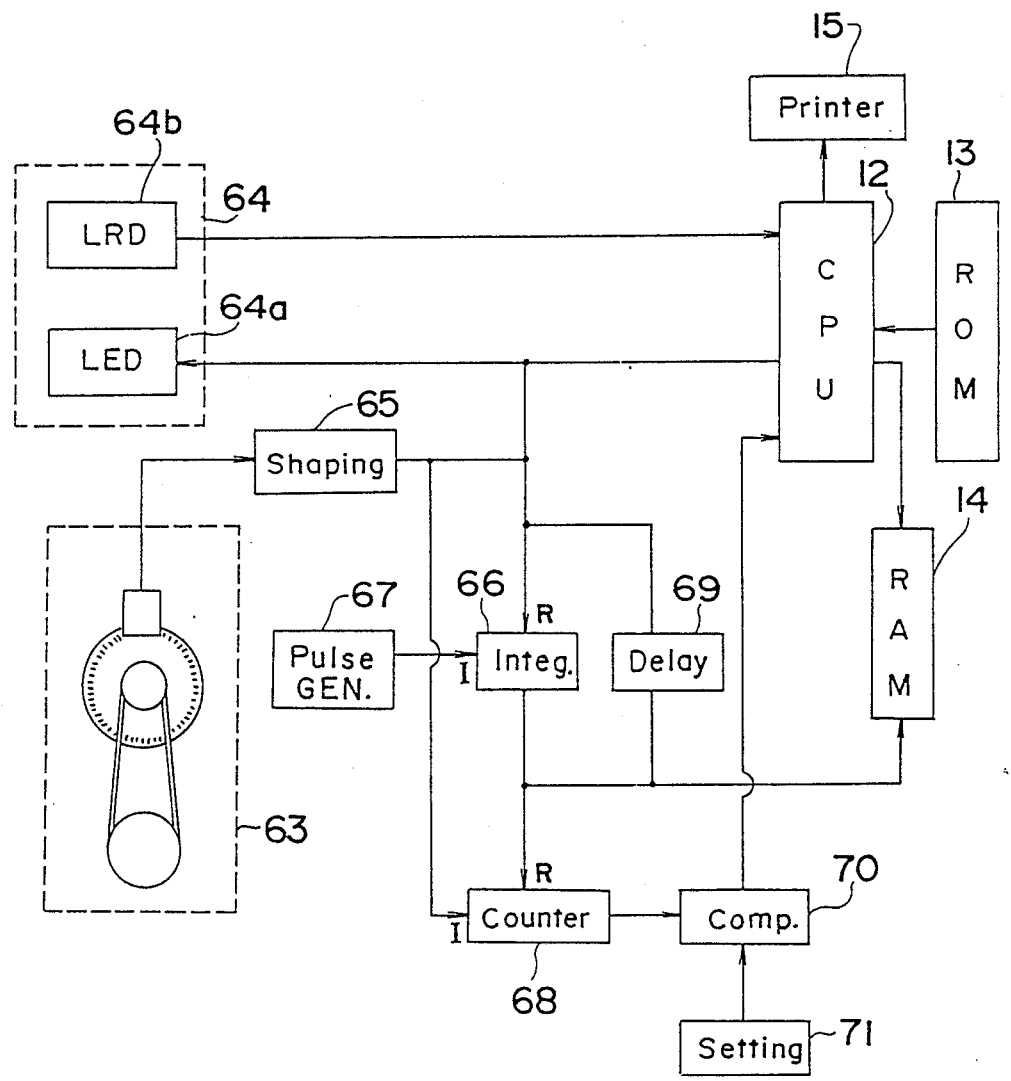
FIG. 27 is a block diagram of an image reader according to other preferred embodiment of the present invention.

In order to avoid such a situation, there is provided such a system as shown in FIG. 27.

When the reading head is moved, pulses generated by the movement detector 63 are shaped by a shaping circuit 65 and are input to a reset terminal R of a detection circuit 66 for detecting a moving speed which is comprised of an integral circuit. Clock pulses generated by a pulse generator 67 are input to an input terminal I of the detection circuit 66 and integrated thereby. When the integrated value becomes larger than a predetermined value, the detection circuit 66 outputs a reset signal to a reset terminal R of a counter 68 and to a delay circuit 69 which is provided for delaying the reset signal by a predetermined time interval and for applying the delayed reset signal to the reset terminal R of the detection circuit 66. The counter 68 counts pulses outputted from the shaping circuit 65 and outputs a count signal to a write-control circuit 70 being comprised of a comparator.

The write control circuit 70 compares the count signal from the counter 68 with a predetermined reference signal set at a setting circuit 71 and, when the count signal becomes larger than the predetermined reference signal, outputs a write command signal to the CPU 12. The CPU drives the light emitting device 64a according to a control program stored in the ROM 13 and image data signals outputted from the light receiving device 64 are input thereinto in a synchronized manner with write control signals stored in the RAM 14. Image data stored in the RAM are outputted to the printer 15 upon printing.

If the reading head 64 is moved slightly before starting a scanning operation, detection pulses are generated by the photointerruptor 63a and the detection circuit 66 is reset by every detection pulse. In this case, the number of detection pulses generated is usually one or two. The integration circuit 66 starts an integration of clock pulses when it is reset. The integrated value thereby becomes larger than the predetermined one if any more detection pulse is not generated and, accordingly, the counter 68 and the RAM are reset by a reset signal outputted from the detection circuit 66 and, after a predetermined delay time, the detection circuit 66 itself is reset. Accordingly, the count value of the counter 68 is lower than the predetermined value set in the comparator 70 and, therefore, the write command signal is never generated. Namely, no image data is memorized in the RAM in the case where the reading head has moved unintentionally.

On the contrary, if the reading head is moved to scan a document image, the counter 68 is not reset since the integration circuit 66 is reset repeatedly by successive detection pulses generated by the photo-interruptor. Accordingly, the count value of the counter 68 is increased so as to exceed the predetermined value set to the comparator 70 and the write control circuit 70 starts to generate write control signals. Therefore, image data are written into the RAM.

In the example mentioned above, an integration circuit for integrating clock pulses is provided for resetting the counter 68, but it is possible to provide a timer in order to reset the counter 68. In this case, the counter 68 is reset when the count value is not increased to a predetermined value in a time-interval set by the timer.

Further, it is to be noted that this system is also effective to the end of scanning operation.

The preferred embodiments described herein are illustrative and not restrictive, the scope of the invention being indicated by the appended claims and all variations which come within the meanings of the claims are intended to be embraced herein.

What is claimed is:

1. An image reader comprising:
   a reading head being capable of scanning a document and which is comprised of detection means for generating pulses according to the movement of the reading head and an image sensor for reading the document image in a manner synchronized with pulses generated by the detection means,
   memory means for storing image data obtained by the image sensor,
   write control means for writing said image data into the memory means,
   image data processing means including dot count means for counting respective sums of real dot data aligned on individual dot lines of said document image and decision means for discriminating against image data contained in an area defined between two of said dot lines for respective sums of real dot data which is less than a predetermined sum value and writing image data greater than said predetermined sum value into the memory means whereby undesired noise data is removed from the image data read by the image sensor prior to writing image data into the memory means and thereafter printing an image of said document, and
   a printer for printing out a noise free image of the image data stored in the memory means.

2. An image reader according to claim 1, wherein the image data processing means includes means for deleting image data of a reference line set for indicating a starting position of a manual scan of said document.

3. An image reader according to claim 1, and further comprises means for controlling the printer to restrict the printing width of the image of said document to the width of said area defined by said decision means.

4. An image reader according to claim 1 wherein said image data processing means includes first and second means for determining starting addresses of real dot data respectively contained in the lower-most dot line of image data obtained by one scan and in the upper-most dot line of image data obtained by the next scan, and data shift means for shifting image data obtained during said next scan by the difference between said starting addresses for bringing the starting position of image data of the upper most dot line obtained by the next scan into coincidence with the starting position of the lower most dot line obtained during the preceding scan.

5. An image reader according to claim 1, wherein said image data processing means further includes means for enlarging said document image by a predetermined magnification from the image data obtained by scanning said document.

6. An image reader according to claim 5, wherein said image data processing means further includes means for limiting enlargement of said document image to the height of an image not exceeding the width of one orienting line of said printer.

7. An image reader according to claim 1, wherein the memory means is controlled to memorize image data only after the reading head has been moved by a predetermined distance in order to compensate for unintentional movement thereof.

* * * * *